(12) United States Patent
Larkins

(10) Patent No.: US 11,910,758 B2
(45) Date of Patent: Feb. 27, 2024

(54) VEGETATION HANGER

(71) Applicant: DriFlower, LLC, Ashland, OR (US)

(72) Inventor: Todd Chandler Larkins, Ashland, OR (US)

(73) Assignee: DRIFLOWER, LLC, Ashland, OR (US)

( * ) Notice: Subject to any disclaimer, the term of this patent is extended or adjusted under 35 U.S.C. 154(b) by 0 days.

(21) Appl. No.: 17/582,217

(22) Filed: Jan. 24, 2022

(65) Prior Publication Data

US 2023/0240193 A1     Aug. 3, 2023

(51) Int. Cl.
*A01F 25/12*     (2006.01)

(52) U.S. Cl.
CPC ................... *A01F 25/12* (2013.01)

(58) Field of Classification Search
CPC . A01G 17/10; A01G 5/04; A01G 5/06; A47G 25/28; A47G 25/30; A47G 7/04; A47G 7/042; A47G 7/047; A01F 25/00; A01F 25/12; A01F 25/125
See application file for complete search history.

(56) References Cited

U.S. PATENT DOCUMENTS

| | | | |
|---|---|---|---|
| 941,448 A | 11/1909 | Haglund | |
| 945,729 A | 1/1910 | Rangnow | |
| 988,468 A * | 4/1911 | Harth | A01F 25/12 |
| | | | 211/113 |
| 1,321,997 A | 11/1919 | Duberstein | |
| 1,515,078 A | 11/1924 | Sheee | |
| 1,833,388 A | 11/1931 | Carmack | |
| 1,868,638 A | 7/1932 | Mackey | |
| 2,099,596 A | 11/1937 | Bruening | |
| 2,150,869 A | 3/1939 | Shafarman | |
| 2,192,167 A * | 3/1940 | Bagley et al. | A47G 25/18 |
| | | | 211/113 |
| 2,279,777 A | 4/1942 | Dean | |
| 2,289,729 A | 7/1942 | Robinson et al. | |
| 2,411,856 A | 12/1946 | Harding | |
| 2,426,292 A * | 8/1947 | Appleman | A47G 25/48 |
| | | | 223/90 |
| 2,484,449 A | 10/1949 | Fetterman | |

(Continued)

FOREIGN PATENT DOCUMENTS

| | | |
|---|---|---|
| CA | 2458956 A1 | 9/2004 |
| CN | 105474854 A | 4/2016 |

(Continued)

OTHER PUBLICATIONS

Chrystal Johnson: 11 How to dry herbs from your Garden, Happy Mothering natural living in a modern world Aug. 29, 2017 (Aug. 29, 2017), Retrieved from the Internet: URL:https://www.happy-mothering.com/diy-ha nging-herb-dryer/.

(Continued)

*Primary Examiner* — Patrick D Hawn
(74) *Attorney, Agent, or Firm* — George Likourezos; Carter, DeLuca & Farrell LLP

(57) ABSTRACT

A vegetation hanger includes a crossbar and an arm coupled to an end portion of the crossbar. The crossbar defines a plurality of serrations configured to prevent the vegetation from sliding on the crossbar. The arm includes a handle and defines a slot configured for hanging the vegetation on a horizontal support bar.

16 Claims, 2 Drawing Sheets

(56) References Cited

U.S. PATENT DOCUMENTS

| | | | |
|---|---|---|---|
| 2,546,929 A | 3/1951 | Nampa | |
| 2,580,193 A | 12/1951 | Richterkessing | |
| 2,586,913 A | 2/1952 | Burns | |
| 2,634,031 A | 4/1953 | Klein | |
| 2,671,938 A | 3/1954 | Roberts | |
| 2,692,711 A | 10/1954 | Norris et al. | |
| 2,716,513 A | 8/1955 | Braunstein | |
| 2,828,897 A | 4/1958 | Gordon | |
| D195,018 S * | 4/1963 | McClelland | 223/95 |
| 3,131,817 A | 5/1964 | Schenkler | |
| 3,194,458 A | 7/1965 | Bennett | |
| D202,954 S | 11/1965 | Hanson | |
| 3,346,150 A | 10/1967 | Clopton | |
| D210,333 S | 2/1968 | Apy | |
| 3,535,808 A | 10/1970 | Morrish | |
| 3,606,948 A | 9/1971 | Strang | |
| 3,874,572 A | 4/1975 | McClenning | |
| D236,572 S | 9/1975 | Ostroll | |
| D264,912 S | 6/1982 | Bliss et al. | |
| 4,440,369 A | 4/1984 | Banks | |
| D278,867 S * | 5/1985 | Tendrup | D6/327 |
| 4,565,309 A * | 1/1986 | Batts | A47G 25/487 |
| | | | D6/326 |
| 4,703,878 A | 11/1987 | Louw | |
| 4,717,053 A | 1/1988 | Wang | |
| 4,724,967 A | 2/1988 | Valiulis | |
| 4,793,531 A | 12/1988 | Blanchard et al. | |
| 4,845,602 A | 7/1989 | Lehocki | |
| 4,881,342 A | 11/1989 | Ferguson | |
| 5,007,562 A | 4/1991 | Brink et al. | |
| 5,074,445 A | 12/1991 | Chen | |
| 5,161,720 A * | 11/1992 | Kolton | A47G 25/743 |
| | | | D6/327 |
| D331,425 S | 12/1992 | Rhyne | |
| 5,170,916 A * | 12/1992 | Kolton | A47G 25/30 |
| | | | 223/92 |
| D332,180 S | 1/1993 | Marshall et al. | |
| 5,329,728 A | 7/1994 | Ray | |
| 5,333,409 A | 8/1994 | Mendes | |
| 5,361,949 A | 11/1994 | Petrou | |
| 5,388,354 A | 2/1995 | Marshall et al. | |
| D357,813 S | 5/1995 | Koresko | |
| 5,520,311 A | 5/1996 | Lam | |
| 5,535,927 A | 7/1996 | Garrison | |
| 5,544,765 A | 8/1996 | Farbman | |
| 5,581,936 A | 12/1996 | Belgiorno | |
| 5,813,092 A | 9/1998 | Greenfield et al. | |
| 5,826,759 A | 10/1998 | Ohsugi | |
| 5,884,422 A | 3/1999 | Marshall et al. | |
| 6,047,867 A | 4/2000 | Heiber | |
| 6,132,305 A | 10/2000 | Witherell | |
| D435,174 S * | 12/2000 | Grisdale | D6/327 |
| 6,298,600 B1 | 10/2001 | Feldman | |
| 6,340,238 B1 | 1/2002 | Pan | |
| 6,349,863 B1 * | 2/2002 | Frye | A47F 7/19 |
| | | | 223/85 |
| 6,389,744 B1 | 5/2002 | Pugh | |
| 6,641,105 B1 | 11/2003 | Hamerski | |
| 6,659,295 B1 | 12/2003 | De Land et al. | |
| 6,811,064 B2 | 11/2004 | Salem | |
| 6,817,497 B2 | 11/2004 | Grasso et al. | |
| D502,756 S | 3/2005 | Birdwell et al. | |
| 6,863,197 B1 | 3/2005 | Dirlam et al. | |
| 7,015,815 B1 | 3/2006 | Feibelman | |
| 7,178,705 B1 | 2/2007 | Sutton | |
| 7,377,409 B1 | 5/2008 | Brown | |
| 7,774,977 B2 | 8/2010 | Miller Shelton | |
| 7,984,585 B1 | 7/2011 | Wu | |
| 8,276,714 B2 | 10/2012 | Broyles | |
| D711,123 S | 8/2014 | Birge | |
| 9,113,736 B1 | 8/2015 | Antler | |
| D772,584 S | 11/2016 | Debus | |
| 9,782,031 B2 | 10/2017 | Debus | |
| D806,410 S | 1/2018 | Denby et al. | |
| D843,121 S * | 3/2019 | Boles | D6/327 |
| D853,737 S | 7/2019 | Wolfe | |
| D867,770 S | 11/2019 | Wright | |
| D873,036 S * | 1/2020 | Cunningham | D6/327 |
| D891,793 S * | 8/2020 | Hong | D6/327 |
| D946,923 S * | 3/2022 | Larkins | D6/513 |
| 11,350,574 B2 * | 6/2022 | Larkins | A01F 25/12 |
| D977,949 S * | 2/2023 | Li | D8/356 |
| 2002/0184799 A1 | 12/2002 | Chou | |
| 2004/0226971 A1 | 11/2004 | Detten | |
| 2005/0035159 A1 | 2/2005 | Hunt et al. | |
| 2005/0139625 A1 | 6/2005 | Gouldson | |
| 2005/0189383 A1 | 9/2005 | Weal et al. | |
| 2006/0032130 A1 | 2/2006 | Lifers et al. | |
| 2006/0226179 A1 | 10/2006 | Hsu | |
| 2007/0266627 A1 | 11/2007 | Shelton | |
| 2008/0236041 A1 | 10/2008 | Carpenter | |
| 2008/0283558 A1 | 11/2008 | Rude et al. | |
| 2011/0247185 A1 | 10/2011 | Bolden et al. | |
| 2011/0284597 A1 | 11/2011 | Kaleta et al. | |
| 2012/0132679 A1 | 5/2012 | Gouldson | |
| 2013/0015215 A1 | 1/2013 | Coote | |
| 2013/0221041 A1 | 8/2013 | Wittenstein et al. | |
| 2014/0246464 A1 | 9/2014 | Zhong | |
| 2014/0367425 A1 | 12/2014 | Laibe | |
| 2015/0176899 A1 * | 6/2015 | Jacques | F26B 21/008 |
| | | | 211/85.7 |
| 2016/0058210 A1 | 3/2016 | Strassburger et al. | |
| 2016/0157649 A1 * | 6/2016 | Harris | F16M 11/00 |
| | | | 211/85.3 |
| 2016/0223137 A1 | 8/2016 | Ochipa | |
| 2017/0105362 A1 | 4/2017 | Irving, Jr. | |
| 2017/0238731 A1 | 8/2017 | Davies | |
| 2017/0325614 A1 | 11/2017 | Baltz | |
| 2018/0087293 A1 | 3/2018 | Strassburger et al. | |
| 2018/0103785 A1 | 4/2018 | Goldman et al. | |
| 2018/0160833 A1 | 6/2018 | Ho | |
| 2018/0303263 A1 | 10/2018 | Jones et al. | |
| 2018/0317685 A1 | 11/2018 | Boles | |
| 2018/0325299 A1 | 11/2018 | Clark et al. | |
| 2018/0356028 A1 | 12/2018 | Fang | |
| 2019/0014936 A1 | 1/2019 | Beyda et al. | |
| 2019/0307264 A1 | 10/2019 | Carr et al. | |
| 2019/0380522 A1 | 12/2019 | Johansson | |
| 2020/0085221 A1 | 3/2020 | Riedel et al. | |
| 2020/0128988 A1 | 4/2020 | Moore et al. | |
| 2020/0245796 A1 | 8/2020 | Gilbert | |
| 2021/0105949 A1 * | 4/2021 | Larkins | A01F 25/12 |
| 2022/0233007 A1 * | 7/2022 | Oakley | A47G 25/487 |
| 2022/0295711 A1 * | 9/2022 | Larkins | A47B 47/0083 |
| 2023/0022423 A1 * | 1/2023 | Donaghy | A01F 25/12 |

FOREIGN PATENT DOCUMENTS

| | | |
|---|---|---|
| CN | 206611910 U | 11/2017 |
| CN | 107896731 A | 4/2018 |
| DE | 3246174 C2 | 1/1994 |
| FR | 2464638 A1 | 3/1981 |
| FR | 3062120 A1 | 7/2018 |
| JP | 2008092939 A | 4/2008 |
| JP | 4218802 B2 | 2/2009 |
| JP | 4399093 B2 | 1/2010 |
| JP | 2011010890 A | 1/2011 |
| KR | 20-2005-0002675 A | 1/2005 |
| KR | 2003821320000 Y1 | 4/2005 |
| KR | 2011 0029352 A | 3/2011 |
| KR | 101071670 B1 | 10/2011 |
| KR | 2012 0131010 A | 12/2012 |
| KR | 2017 0067056 A | 6/2017 |
| KR | 20170079314 A | 7/2017 |
| KR | 101938225 B1 | 1/2019 |
| WO | 2018150157 A1 | 8/2018 |

OTHER PUBLICATIONS

International Search Report and Written Opinion for Application No. PCT/US2020/042261 dated Nov. 2, 2020.

(56) References Cited

OTHER PUBLICATIONS

International Search Report and Written Opinion issued in corresponding International Application No. PCT/US2020/053426 dated Jan. 18, 2021, 14 pages.
International Search Report and Written Opinion issued in corresponding International Application No. PCT/US2020/054898 dated Jan. 22, 2021, 14 pages.
International Preliminary Report on Patentability issued in corresponding international application No. PCT/US2020/053426 dated Apr. 5, 2022, 6 pages.

* cited by examiner

VEGETATION HANGER

FIELD

The present disclosure generally relates to a hanger and more particularly, to a hanger for facilitating hang harvesting, transportation, drying and unloading of vegetation.

BACKGROUND

Vegetation, such as plants, herbs, flowers, hemp and/or *cannabis*, and other vegetation, are harvested, and then subsequently dried to produce a final product. Typically, during the drying process, vegetation is hung on plastic netting, which causes stress to the user and damages vegetation. This process requires the vegetation to be hung one branch at a time and threaded through the netting to secure the vegetation. Removal of the vegetation also requires careful unthreading of the vegetation one branch at a time from the plastic netting. Therefore, there is a need to provide a method of facilitating hang harvesting, transporting, drying, and unloading of vegetation without damaging the vegetation.

SUMMARY

The present disclosure relates to a vegetation hanger to facilitate hang harvesting, transporting, drying, and unloading of vegetation. The hanger includes an elongated crossbar and a hanger portion coupled to the crossbar. The crossbar has opposed first and second end portions and an upper-facing edge defining a plurality of undulations along a length of the crossbar that are configured to support vegetation and prevent sliding of the vegetation along a longitudinal axis defined by the elongated crossbar. The hanger portion defines a slot configured for receipt of a horizontal support bar.

In aspects, the hanger portion may define an elongate aperture positioned adjacent the slot. The elongate aperture may be configured for receipt of a hand of a user.

In aspects, the elongate aperture may be aligned with the slot along a horizontally-extending longitudinal axis of the hanger portion.

In aspects, the horizontally-extending longitudinal axis of the hanger portion may be parallel with the longitudinal axis of the crossbar.

In aspects, the elongate aperture may be closed and the slot may be open.

In aspects, the slot may have a width defined by a pair of vertically-extending, linear surfaces of the hanger portion.

In aspects, the slot may have a rectangular portion configured for receipt of the horizontal support bar to prevent shifting of the horizontal support bar in a direction parallel with the longitudinal axis of the elongated crossbar.

In aspects, the slot may further include a V-shaped portion positioned above and in communication with the rectangular portion.

In aspects, the hanger may further include a stem having a first end portion connected to the first end portion of the elongated crossbar, and a second end portion connected to a first end portion of the hanger portion.

In aspects, the hanger portion may have a second end portion, and the slot may be defined in the second end portion of the hanger portion.

In aspects, the slot may overhang a central portion of the elongated crossbar.

In aspects, the hanger portion, the stem, and the elongated crossbar may be monolithically formed from a metal plate.

In aspects, the stem may be configured to prevent the vegetation from sliding off the first end portion of the elongated crossbar.

In aspects, the second end portion of the elongated crossbar may include a lip that protrudes upwardly relative to the upper-facing edge such that the lip prevents the vegetation from sliding off the second end portion of the elongated crossbar.

In aspects, the elongate aperture may have a length extending parallel with a length of the elongated crossbar, and the slot may have a length that is perpendicular to the length of the elongated crossbar.

In aspects, the elongated crossbar may have a bottom-facing edge opposite the upper-facing edge. The bottom-facing edge may have a bent portion extending outwardly from the elongated crossbar at a 90 degree angle.

In accordance with another aspect of the present disclosure, a hanger for supporting vegetation thereon is provided that includes an elongated crossbar, a stem, and a hanger portion. The elongated crossbar has opposed first and second end portions and an upper-facing edge having serrations along a length of the elongated crossbar that are configured to support vegetation and prevent sliding of the vegetation along a longitudinal axis defined by the elongated crossbar. The stem has a first end portion coupled to the first end portion of the elongated cross bar. The hanger portion has a first end portion coupled to a second end portion of the stem and extends in parallel relation with the longitudinal axis of the elongated crossbar. The hanger portion defines a slot configured for receipt of a horizontal support bar, and an elongate aperture positioned adjacent the slot. The elongate aperture is configured for receipt of a hand of a user.

In aspects, the stem may be configured to prevent the vegetation from sliding off the first end portion of the elongated crossbar. The second end portion of the elongated crossbar may include a lip that protrudes upwardly relative to the upper-facing edge such that the lip prevents the vegetation from sliding off the second end portion of the elongated crossbar.

As used herein, the terms parallel and perpendicular are understood to include relative configurations that are substantially parallel and substantially perpendicular up to about + or −10 degrees from true parallel and true perpendicular.

BRIEF DESCRIPTION OF DRAWINGS

A better understanding of the features and advantages of the disclosed technology will be obtained by reference to the following detailed description that sets forth illustrative aspects, in which the principles of the technology are utilized, and the accompanying figures of which.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure, features illustrated herein, and any additional applications of the principles of this disclosure as illustrated herein, which would occur to one skilled in the relevant art and having possession of this disclosure, are to be considered within the scope of this disclosure.

Figure 1:
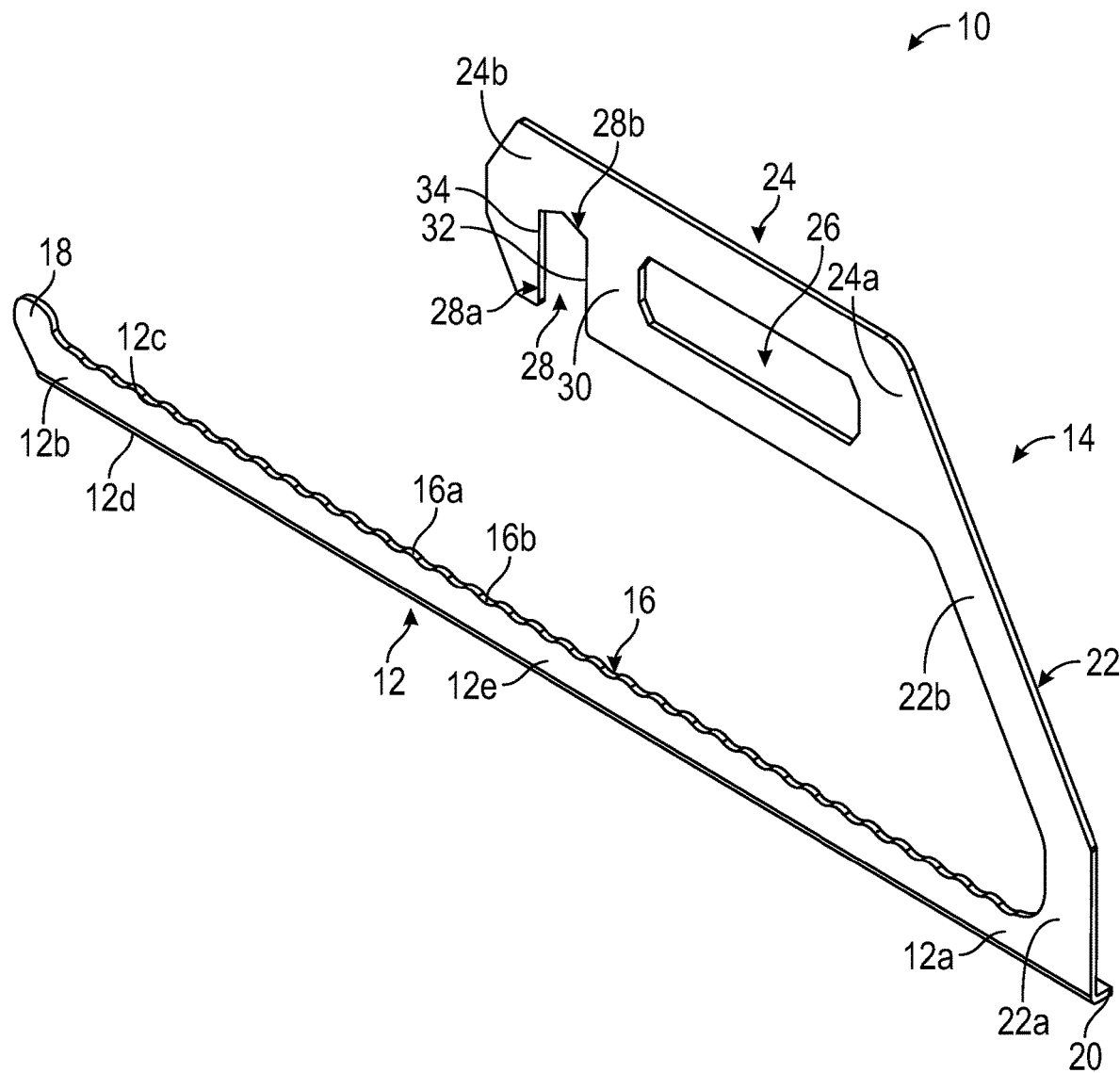
FIG. 1 is a front perspective view of a vegetation hanger in accordance with the present disclosure.
Figure 2:
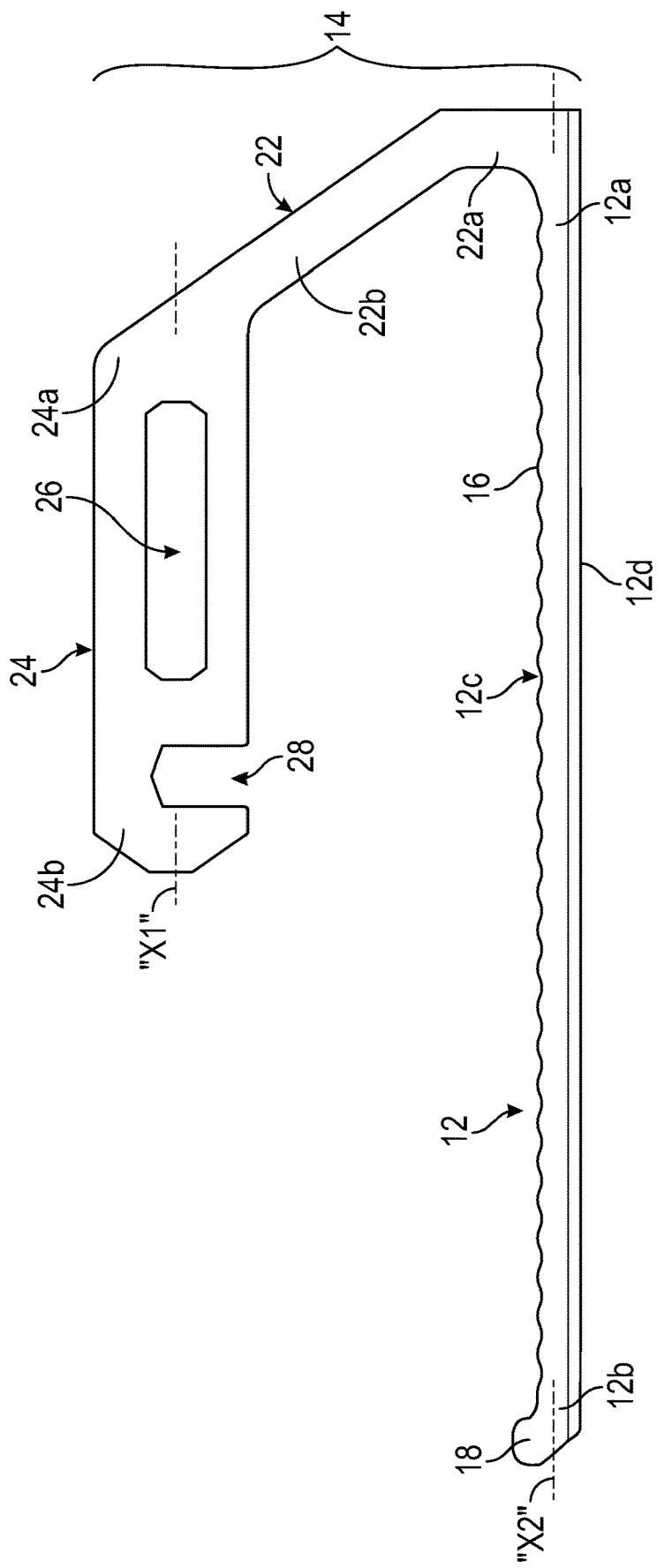
FIG. 2 is a front view of the vegetation hanger of FIG. 1.

With reference to FIGS. 1 and 2, a vegetation hanger provided in accordance with the present disclosure is shown generally identified by reference numeral 10. The vegetation hanger 10 generally includes an elongated crossbar 12 and an arm 14 extending from the elongated crossbar 12. The elongated crossbar 12 and the arm 14 are monolithically formed from a single piece of sheet metal (e.g., stainless steel). Other types of materials are also contemplated for the vegetation hanger 10, such as, for example, plastics. In other aspects, the elongated crossbar 12 and the arm 14 may be integrally connected to one another via welding, adhesives, or the like. The elongated crossbar 12 and arm 14 may have a thickness from about 0.065 inches to about 0.12 inches, and in embodiments about 0.09 inches, a vertical height from about 6 inches to about 7 inches, and in embodiments about 6.30 inches, and a length from about 13 inches to about 20 inches, and in embodiments about 17 inches.

The elongated crossbar 12 may be an elongate plate having a first end portion 12a coupled to the arm 14, and an opposite second end portion 12b, an upper-facing edge 12c, and an opposite bottom-facing edge 12d. The upper-facing edge 12c has a plurality of undulations 16, such as, for example, serrations, extending along a length of the elongated crossbar 12 configured to facilitate the hanging of vegetation thereon while preventing sliding of the vegetation relative to and along the elongated crossbar 12. The undulations may include a plurality of alternating arcuate ridges 16a and depressions 16b. Other shapes for the ridges 16a and depressions 16b are also contemplated, such as, for example, triangular or squared. The pitch of the undulations 16 may be from about 0.25 inches to about 0.75 inches, and in embodiments about 0.5 inches.

The elongated crossbar 12 has a lip 18 protruding upwardly from the second end portion 12b to prevent unintended lateral movement of the vegetation off the second end portion 12b of the elongated crossbar 12. When intended, lateral movement of all the vegetation hung on the crossbar 12 off the second end portion 12b thereof at once may be initiated by a user. The elongated crossbar 12 may have a ledge or bent portion 20 (FIG. 1) protruding perpendicularly from the bottom-facing edge 12d of the elongated crossbar 12. The ledge 20 may enhance the structural integrity of the elongated crossbar 12 to inhibit warping thereof and/or may facilitate stacking of a plurality of the vegetation hangers 10 on one another.

The elongated crossbar 12 may be fabricated at any suitable length, which, as non-limiting examples, may be one of about 17 inches, 21 inches, 41 inches, or 61 inches to accommodate different open spaces, amounts of vegetation to be dried, and support of vegetation within a drying system.

The arm 14 of the vegetation hanger 10 includes a stem 22 directly connected to the elongated crossbar 12, and a hanger portion 24 directly connected to the stem 22. More specifically, the stem 22 of the arm 14 has a first end portion 22a extending vertically upward from the first end portion 12a of the elongated crossbar 12, and a second end portion 22b extending upwardly from the first end portion 22a of the stem 22 and in a direction generally toward the second end portion 12b of the elongated crossbar 12. The second end portion 22b of the stem 22 may extend at an obtuse angle relative to the first end portion 22a of the stem 22. The second end portion 22b of the stem 22 may extend at other suitable angles relative to the first end portion 22a, such as, for example, a 90 degree angle or an acute angle.

The hanger portion 24 of the arm 14 defines a longitudinal axis "X1" that is parallel with a longitudinal axis "X2" defined by the elongated crossbar 12 such that the hanger portion 24 overhangs the elongated crossbar 12. The hanger portion 24 has a first end portion 24a formed with or otherwise coupled to the second end portion 22b of the stem 22, and an opposite second end portion 24b. The hanger portion 24 defines an elongate aperture 26 configured for receipt of one or more fingers of a hand of a user to allow for a user to grasp and carry the vegetation hanger 10. The elongate aperture 26 may be positioned above the center of gravity of the vegetation hanger 10 to ensure the vegetation hanger 10 remains balanced in a user's hand.

The second end portion 24b of the hanger portion 24 defines a vertically-extending slot 28 that is open to and facing the elongated crossbar 12. The slot 28 overhangs a central portion 12e of the elongated crossbar 12. The slot 28 defines a length in a direction perpendicular to the longitudinal axis "X1" of the hanger portion 24, whereas the elongate aperture 26 defines a length that is parallel with the longitudinal axis "X1" of the hanger portion 24 such that the slot 28 and the elongate aperture 26 are set perpendicularly relative to one another. The slot 28 and the elongate aperture 26 may be blocked off from one another by a wall 30 of the hanger portion 24 positioned therebetween.

The slot 28 includes a bottom portion 28a having a rectangular shape, and a top portion 28b having a V-shape. The bottom portion 28a is defined by a pair of vertically-extending linear surfaces 32, 34 that are configured to cradle corresponding lateral sides of a horizontal support bar (not shown) having a rectangular cross-section. In this way, when the horizontal support bar is received in the slot 28, the vegetation hanger 10 is inhibited from shifting in either direction along the longitudinal axis "X1" of the hanger portion 24 or tilting. The V-shape of the top portion 28b of the slot 28 facilitates the use of the vegetation hanger 10 on wire, string, rope, plastic netting, chain, cage or fencing.

In operation to dry vegetation, the vegetation hanger 10 is hung on a mounting surface, such as a horizontal support bar (not shown) at the point of harvest by positioning the horizontal support bar within the slot 28 of the hanger portion 24. With the horizontal support bar positioned within the slot 28, the vegetation hanger 10 is suspended from the ground and prevented from tilting or shifting. The vegetation may be cut (e.g., to about 17" in length) and hung along the upper-facing edge 12c of the elongated crossbar 12. Each piece of harvested vegetation can be placed between adjacent ridges 16a of the undulations 16 (e.g., in the depressions 16b) to prevent individual movement of the vegetation. Once all the vegetation has been placed on the crossbar 12 of the vegetation hanger 10, the vegetation hanger 10 may be carried (e.g., by a user) via the elongate aperture 26 from the point of harvest to the final drying location. When the vegetation is to be removed, all of the vegetation may be slid over the lip 18 and off the second end portion 12b of the elongate crossbar 12.

While several embodiments of the disclosure have been detailed above and are shown in the drawings, it is not intended that the disclosure be limited thereto, as it is intended that the disclosure be as broad in scope as the art will allow and that the specification be read likewise. Therefore, the above description and accompanying drawings should not be construed as limiting, but merely as exemplifications of particular embodiments. Those skilled in the art will envision other modifications within the scope and spirit of the claims appended hereto.

What is claimed is:

1. A hanger for supporting vegetation thereon, comprising: an elongated crossbar having opposed first and second end portions, the elongated crossbar including an upper-facing edge defining a plurality of undulations along a length of the elongated crossbar that are configured to support vegetation and prevent sliding of the vegetation along a longitudinal axis defined by the elongated crossbar; and a hanger portion extending from the first end portion of the elongated crossbar, the hanger portion defining a slot configured for receipt of a horizontal support bar, wherein the hanger portion defines an elongate aperture positioned adjacent the slot, the elongate aperture configured for receipt of a hand of a user, wherein the elongate aperture is aligned with the slot along a horizontally-extending longitudinal axis of the hanger portion, and wherein the elongate aperture is closed and the slot is open.

2. The hanger according to claim 1, wherein the horizontally-extending longitudinal axis of the hanger portion is parallel with the longitudinal axis of the elongated crossbar.

3. The hanger according to claim 1, wherein the slot has a width defined by a pair of vertically-extending, linear surfaces of the hanger portion.

4. The hanger according to claim 1, wherein the slot has a rectangular portion configured for receipt of the horizontal support bar to prevent shifting of the horizontal support bar in a direction parallel with the longitudinal axis of the elongated crossbar.

5. The hanger according to claim 4, wherein the slot further includes a V-shaped portion positioned above and in communication with the rectangular portion.

6. The hanger according to claim 1, further comprising a stem having a first end portion connected to the first end portion of the elongated crossbar, and a second end portion connected to a first end portion of the hanger portion.

7. The hanger according to claim 6, wherein the hanger portion has a second end portion, the slot being defined in the second end portion of the hanger portion.

8. The hanger according to claim 7, wherein the slot overhangs a central portion of the elongated crossbar.

9. The hanger according to claim 6, wherein the hanger portion, the stem, and the elongated crossbar are monolithically formed from a metal plate.

10. The hanger according to claim 6, wherein the stem is configured to prevent the vegetation from sliding off the first end portion of the elongated crossbar.

11. The hanger according to claim 10, wherein the second end portion of the elongated crossbar includes a lip that protrudes upwardly relative to the upper-facing edge such that the lip prevents the vegetation from sliding off the second end portion of the elongated crossbar.

12. The hanger according to claim 1, wherein the elongate aperture has a length extending parallel with a length of the elongated crossbar, and the slot has a length that is perpendicular to the length of the elongated crossbar.

13. The hanger according to claim 1, wherein the elongated crossbar has a bottom-facing edge opposite the upper-facing edge, the bottom-facing edge having a bent portion extending outwardly from the elongated crossbar at a 90 degree angle.

14. A hanger for supporting vegetation thereon, comprising: an elongated crossbar having opposed first and second end portions, the elongated crossbar including an upper-facing edge having serrations along a length of the elongated crossbar that are configured to support vegetation and prevent sliding of the vegetation along a longitudinal axis defined by the elongated crossbar; a stem having a first end portion extending from the first end portion of the elongated cross bar, and a second end portion; and a hanger portion having a first end portion extending from the second end portion of the stem and extending in parallel relation with the longitudinal axis of the elongated crossbar, the hanger portion defining a slot configured for receipt of a horizontal support bar, an elongate aperture positioned adjacent the slot, the elongate aperture configured for receipt of a hand of a user, wherein the elongate aperture is aligned with the slot along a horizontally-extending longitudinal axis of the hanger portion, and wherein the elongate aperture is closed and the slot is open.

15. The hanger according to claim 14, wherein the stem is configured to prevent the vegetation from sliding off the first end portion of the elongated crossbar, and the second end portion of the elongated crossbar includes a lip that protrudes upwardly relative to the upper-facing edge such that the lip prevents the vegetation from sliding off the second end portion of the elongated crossbar.

16. The hanger according to claim 14, wherein the slot has a rectangular portion configured for receipt of the horizontal support bar to prevent shifting of the horizontal support bar in a direction parallel with the longitudinal axis of the elongated crossbar.

\* \* \* \* \*